March 19, 1940.   M. P. WINTHER   2,193,836
AIR CONDITIONING SYSTEM FOR RAILWAY CARS
Filed May 23, 1934
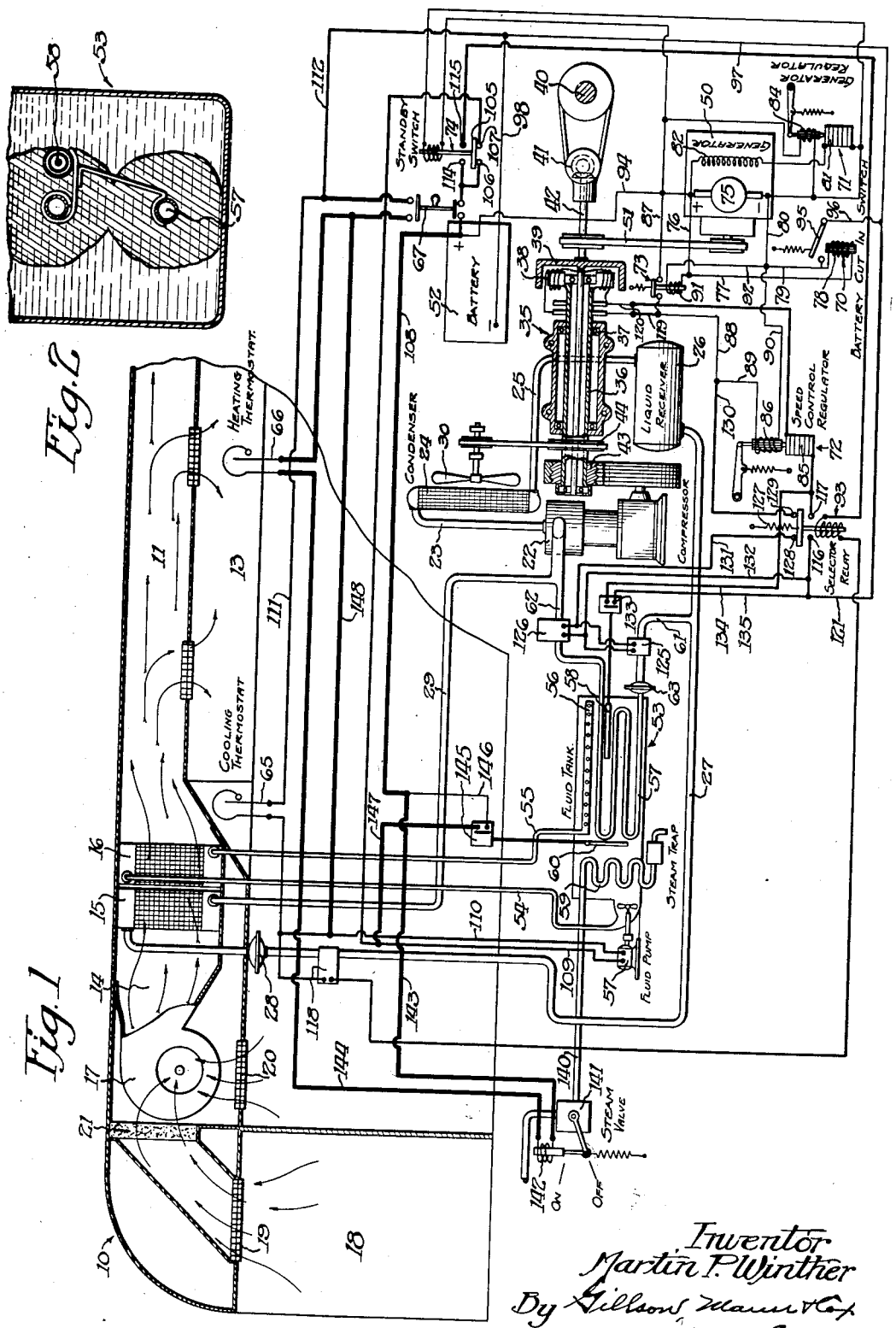
Inventor
Martin P. Winther
By Gillson, Mann & Co.
Attys.

Patented Mar. 19, 1940

2,193,836

UNITED STATES PATENT OFFICE 2,193,836

AIR CONDITIONING SYSTEM FOR RAILWAY CARS

Martin P. Winther, Waukegan, Ill., assignor to Pullman-Standard Car Manufacturing Company, Chicago, Ill., a corporation of Delaware Application May 23, 1934, Serial No. 727,149

17 Claims. (Cl. 62—6)

Railway cars are often required to lay over at stations to await connecting trains and any practical system of passenger car air conditioning must be capable of furnishing properly conditioned air during such periods. A similar problem is presented when a train is ascending a long grade and the speed of the train is insufficient to furnish the necessary power for operating the air conditioning system.

The problem is usually met by equipping the air conditioned cars with auxiliary generators and storage batteries so that electrical energy may be stored for use in operating the apparatus when the car is stopped, or when car movement is insufficient to supply the necessary energy. But this attempted solution to the problem is expensive and adds much weight to car equipment.

The present invention offers a solution to the problem by storing refrigeration, rather than electrical energy, while the car is running. If an air conditioning system is properly designed, the refrigerating equipment always has sufficient capacity to carry the peak load, which in passenger car installations is approximately one-third greater than the normal load. Consequently the refrigerating equipment is idle a portion of the time during normal operation, and advantage is taken of this fact in the system of the invention.

The principal object of the invention is to provide a completely automatic air conditioning system for railway cars—particularly insofar as its operation deals with the furnishing of temperature control—but other objects are to reduce weight, conserve power, avoid bulk, and utilize the full capacities of the apparatus to effect these and other economies.

Further and other objects and advantages will appear as the disclosure proceeds, and the description is read in conjunction with the accompanying drawing, in which Fig. 1 is a semi-diagrammatic view showing a preferred embodiment of the invention; and Fig. 2 illustrates the operation of the ice thermostat in the fluid task.

A preferred embodiment of the invention is shown in the drawing and will hereafter be described, but this is for the purpose of disclosure only and should not be construed to impose limitations on the appended claims unless required by the prior art.

The invention has been shown applied to a standard passenger car, or Pullman, having a body 10 equipped with an air duct 11 adjacent to the roof. The duct preferably runs the entire length of the car and grilles 12, spaced apart at suitable intervals, connect the duct with the passenger space 13.

An air conditioning chamber 14 is located overhead at one end of the car body and contains a primary coil 15 and a secondary coil 16. A centrifugal blower 17, which is also located overhead, draws air from the car vestibule 18 through a grille 19 and from the passenger space 13 through a grille 20 and forces the air through the coils 15 and 16 into the duct 11 where the air is distributed throughout the passenger space. Preferably, a filter 21 is interposed between the fresh air intake 19 and the blower 17, and this filter may be either of the mechanical type, or it may consist of a water spray.

As this invention is more particularly concerned with the means for adding and removing heat units from the current of air which is passed into the car than it is with the particular system of air distribution and its method of control, no attempt will be made to discuss the control of the air movement, or the many possible variations from the arrangement shown in the drawing.

Suffice it to say that the grilles 19 and 20 may be provided with suitable dampers for controlling the proportion of fresh and re-circulated air, and these may be controlled in any well known manner. Also, the air conditioning chamber 14 may be equipped with humidifying apparatus and any other apparatus which is common to installations of this character. The invention is in no way limited to the details of the air distribution system.

*Principal elements of the air conditioning system; and their general organization*

In the system of this invention, the air passing through the conditioning chamber 14 is cooled by the direct expansion of refrigerant within the primary coil 15 as long as the temperature of the air within the passenger space is above a predetermined maximum and provided the car is operating above a predetermined minimum speed. When a sufficient lowering of the temperature within the car has been obtained, the system automatically operates to store refrigeration in a fluid tank located preferably beneath the car body. The fluid tank contains a solution having a low freezing point, a mixture of 90% water and 10% ethylene glycol having been found satisfactory. The storing of refrigeration in the fluid tank continues until a given amount of refrigeration has been accumulated, and then the refrigerating apparatus shuts down.

If, in the meantime, the speed of the car drops below the predetermined minimum, so that the refrigerating apparatus cannot maintain the proper suction pressure within the direct expansion coil 15, the cold liquid within the fluid tank is circulated through the coil 16 and thus continues to cool the air which is being forced into the car interior.

The refrigerating apparatus comprises a compressor 22 which discharges through a pipe 23 into a condenser 24 where the refrigerant is liquefied. From there, the refrigerant passes through a pipe 25 into a liquid receiver 26 and thence through a pipe 27 to an expansion valve 28 which permits the refrigerant to expand into the coil 15 at a given suction pressure. The expanded gas is returned to the compressor through a pipe 29.

The compressor, condenser and liquid receiver are preferably located beneath the car body and are arranged so that the natural draft from car movement will to a certain extent keep them cool. Fans, however, are employed where necessary, as for example a condenser fan 30.

The compressor is driven directly from the car axle through an electro-magnetic clutch generally indicated at 35. The clutch consists of a quill shaft 36 journalled in a housing 37 and having one end equipped with field coils 38 which coact with a cup-shaped armature 39 driven from the car axle 40 through a gear box 41 and shaft 42. The armature 39 always revolves at a rate proportional to car speed and the extent of energization of the field coils 38 determines the rate of rotation of the quill shaft 36. The rear end of the quill shaft is equipped with pulleys 43 and 44 for driving the compressor and condenser fan, respectively.

A generator 50 supplies the necessary electrical energy for the operation of the air conditioning system and is driven by a belt 51 from the shaft 42. It, of course, may be operated from another car axle if desired.

A battery 52 is arranged to float on the generator 50 to provide the electrical requirements of certain parts of the apparatus when the car is stopped, or is travelling below a predetermined minimum speed.

The fluid tank 53 is a part of a closed fluid circuit which includes pipes 54, the secondary coil 16 and pipe 55. The latter pipe enters the fluid tank and discharges the fluid which it carries through small orifices 56.

Circulation of fluid through the circuit is effected by a fluid pump 57.

Within the fluid tank 53 is an evaporator coil 57, an ice thermostat 58, a steam coil 59, and a hot water thermostat 60. The evaporator coil 57 is connected in parallel with the primary coil 15 through pipes 61 and 62 which connect with the pipes 27 and 29, respectively. An expansion valve 63 is interposed between the pipe 61 and the evaporator coil 57 to regulate the pressure at which the refrigerant is expanded into the coil 57.

A cooling thermostat 65 and a heating thermostat 66, both of which are located within the passenger space, control the operation of the system, and a hand switch 67 initially determines which of the two thermostats is operative.

For convenience of description, the electrical circuits will be grouped under the headings of control circuits, cooling circuits and heating circuits and light, medium and heavy lines have been used in the drawing for distingushing the three groups of circuits, respectively.

Control circuits

Under this heading are five control devices, all of which are operated in response to the generator voltage. These devices are: A battery cut-in switch 70, a generator regulator 71, a speed control regulator 72, a compressor switch 73, and a standby relay 74.

The battery cut-in switch 70 disconnects the battery from the generator when the car speed is such that the generator output is less than the battery voltage. The circuit which controls this switch includes conductors 76, 77, solenoid 78, and conductors 79 and 80.

The generator regulator increases the resistance in the generator field as the car speed increases so that the output of the generator is maintained within desired limits. The regulator includes a carbon pile 81 which is in series with the generator field 82, the latter being connected across the generator armature 75. Pressure on the carbon pile is automatically decreased as car speed increases, by a solenoid 84 connected across the generator armature 75.

The speed control regulator 72 is very similar to the generator regulator and consists of a carbon pile 85 to which pressure is variably applied by a solenoid 86 connected by conductors 87, 88, 89 and 90 across the generator armature. It will be observed that the compressor switch 73 is in series with this circuit.

The purpose of the speed control regulator is to increase the resistance in the circuit through the field coils 38 of the electromagnetic clutch 35 as the car speed becomes greater so that the current through the coils 38 is reduced and, as a consequence, more slippage is effected in the clutch. In this way, the speed of the compressor is maintained within reasonable limits.

The compressor switch 73 cuts out the electromagnetic clutch until the car speed is above a certain minimum, so that the compressor will not constitute a drag on the car at low speeds when friction losses are high. The compressor switch 73 may be eliminated, of course, under some circumstances, but it is particularly desirable when an electric motor is substituted for the electro-magnetic clutch 35 to drive the compressor 22.

The solenoid 91 of the compressor switch is connected across the generator armature by conductors 76, 92 and 80.

The standby switch 74 places the fluid pump 57 in operation when the car is stopped, or travelling at low speeds. Otherwise, it places the generator and battery in series with the cooling thermostat 65 and a selector relay 93.

The generator, it will be observed, is connected to the battery through conductors 94 and conductors 80, 79, switch armature 95, conductors 96, 97 and 98.

Cooling circuits

It has already been stated that the primary coil 15 is in operation as long as the car is operating above the predetermined minimum speed, and there is need for air cooling.

Let us assume now that the car speed is maintained, but that the cooling thermostat 65 is opened, due to the air in the car having a sufficiently low temperature.

The compressor 22 is then made to supply refrigerant to the evaporator coil 57 at a pressure of say 18 lbs. which, for a refrigerant such as Freon (dichlorodifluoromethane), would correspond to a temperature of around 10° or 15° above zero Fahrenheit. This pressure and temperature compares with a temperature of 45° F. and approximately 50 lbs. pressure in the coil 15 when it is in operation.

The low temperature of the refrigerant in the coil 57 causes ice to form upon the pipes as the temperature of the fluid within the tank gradually diminishes and finally a sufficient quantity of ice is built up on the pipes to encase the ice thermostat 58 (see Fig. 2). At the moment when this occurs, the heat sensitive element in the thermostat 58 (which may be of any suitable form) moves quickly due to the fact that until the thermostat is surrounded by ice, a portion of it is exposed to the circulating fluid which may have a temperature of around 30° F., whereas the ice has a much lower temperature. As soon as the ice surrounds the thermostat, it insulates the thermostat from the higher temperature of the fluid and this sudden drop in temperature is recorded by the thermostat and operates to shut off the compressor motor.

Whenever the car speed falls below the predetermined minimum, the fluid pump 57 is automatically started and as the circulation of fluid continues, the ice is slowly melted from the evaporator coil 57 so that the temperature of the fluid is maintained at the desired low temperature.

In considering the cooling circuits, let us first assume that the car is stopped, or is moving below a predetermined minimum speed and refrigeration has been stored in the fluid tank by previous operation of the car. In such a case, the standby relay 74 is de-energized and the armature 105 closes the contacts 106 and 107. This connects the battery 52 with the fluid pump 57 through conductors 108, 109, 110, 111, 112 and 98. It will be observed that the cooling thermostat 65 is also in this circuit so that the fluid pump is stopped whenever there is no need for further air cooling.

Now let it be assumed that the car is moving above the predetermined minimum speed, and the thermostat 65 calls for cooling. In such a case, the standby relay 74 is energized, and the armature 105 bridges the contacts 114 and 115; the selector relay 93 is also energized, and the contacts 116 and 117 are bridged; the shut-off valve 118 in the refrigerant pipe 27 is open (the valve automatically closing whenever the circuit is broken); and the compressor switch 73 is closed. This latter switch places the electromagnetic clutch in operation and its circuit can be traced from the positive side of the generator armature 75, through conductor 87, compressor switch 73, conductor 119 to a commutator on the quill shaft 36, thence through the field coil 38, a return commutator, conductor 120, speed control regulator 72 through the contacts 117 and 116 which are bridged by the armature of the selector relay, thence through conductor 121 to conductor 96, switch armature 95 of the battery cut-in switch, conductors 79 and 80, back to the negative side of the generator. The compressor switch 73 preferably is adjusted so that it closes whenever the battery cut-in switch 70 closes.

The energization of the electromagnetc clutch 35 places the compressor 22 in operation and refrigerant is delivered to the coil 15 through the pipe 27 and expansion valve 28 and returned to the compressor through the pipe 29.

It is desirable to cut off the evaporator coil 57 from the compressor when the primary coil 15 is in operation in order to prevent refrigerant from condensing in the latter coil, and this is accomplished by electro-magnetic shut-off valves 125 and 126 interposed in the refrigerant lines 61 and 62, respectively. These valves are closed whenever the circuit through the valves is open.

As soon as the temperature within the car has been lowered a sufficient amount under the conditions last stated, the thermostat 65 opens and the circuit through the selector relay 93 and the shut-off valve 118 is broken. The refrigerant line 27 is thus closed and the selector relay armature is lifted by a spring 127 or equivalent means to bridge the contacts 128 and 129. With these contacts bridged, a shunt circuit can be traced from the conductor 88 in the speed control circuit through conductor 130, contacts 129 and 128, conductor 131, through the shut-off valves 125, 126, leading to the evaporator coil 57, thence through conductor 132 to conductor 121 and thence back to the negative side of the armature 75 through conductors 96, armature 95 of the battery cut-in, and conductors 79 and 80.

This last mentioned shunt circuit when energized by connecting the contacts 128 and 129 opens the shut-off valves 125 and 126 and places the evaporator coil 57 in operative connection with the compressor 22 while at the same time shut-off valve 118 is closed in the refrigerant line leading to the primary coil 15.

It will be observed that the de-energization of the selector relay 93 does not itself open the circuit through the electro-magnetic clutch 35 because a shunt circuit is provided which includes a relay 133 operated in response to the ice thermostat 58. This shunt circuit is connected across the contacts 116 and 117 and may be traced through conductors 134 and 135. Hence the electro-magnetic clutch 35 operates as long as either the primary coil 15 or the evaporator coil 57 require the compressor 22 to be running.

Instead of using an electro-magnetic clutch in driving the compressor directly from the car axle, it is possible to employ an electric motor having its terminals connected across the conductors 119 and 120 at the point where they are shown connected to the commutators of the clutch 35. The compressor switch 73 would be essential in such a case if it is intended that the compressor be idle when the car is standing, or travelling below a given speed. Of course, if large batteries are used, the switch 73 could be omitted.

Heating circuits

When the manual switch 67 is moved upwardly in Fig. 1, it bridges two contacts which places the heating system in operation.

The steam coil 59 in the tank 53 is adapted to be fed through a pipe 140 which connects with a steam valve 141 automatically controlled by a solenoid 142 in series with the heating thermostat 66. The circuit controlling the operation of the valve can be traced from the positive side of the battery and generator through conductors 108 and 143 to the solenoid 142, thence through conductor 144 to the heating thermostat and thence through the switch 67 and conductors 112 and 98, back to the negative side of the battery and generator. When the heating thermostat is closed, the steam valve is on, as can readily be seen from the drawing.

The fluid pump 57 is adapted to function as long as the hand switch 67 calls for heating—unless the hot water thermostat 60 which controls the operation of an electro-magnetic relay 145 indicates that the temperature of the fluid is below a predetermined amount, for example 110° F. The manner in which this function is accomplished is readily understood by observing that the circuit which controls the fluid pump is in series with the thermostatic relay 145, but does not include the heating thermostat 66. The circuit can be traced from the positive side of the battery and generator through conductors 108, 146, thermostatic relay 145, conductors 147 and 109, thence through the fluid pump 57, conductor 110, conductor 148 and back to the negative side of the battery and generator through the hand switch 67, conductors 112 and 98.

The steam coil 59 is thus intermittently operated in accordance with the demands of the heating thermostat while the fluid pump is continuously operated unless the temperature of the fluid should for some reason fall below a predetermined minimum.

The primary coil 15 is in reality a direct expansion coil since the refrigerant is permitted to expand directly into the coil. The secondary coil 16 is ordinarily termed an indirect expansion coil due to the fact that the fluid which circulates through it is a secondary refrigerant, i. e. it is cooled by a primary refrigerant, which in this case is circulated through the evaporator coil 57.

The invention may be variously embodied within the scope of the appended claims.

What I claim, therefore, is:

1. In combination with a passenger car, means for forcing a current of air into the car, primary and secondary coils in the path of the air, a fluid circuit including the secondary coil, an evaporator coil in the fluid circuit connected in parallel with the primary coil, refrigerating apparatus adapted to supply refrigerant to either the primary or the evaporator coil, means for circulating the fluid in said circuit and means responsive to the temperature within the car for determining which coil is to receive refrigerant from the apparatus.

2. In combination with a passenger car, means for forcing a current of air into the car, primary and secondary coils in the path of the air, a fluid circuit including the secondary coil, an evaporator coil in the fluid circuit connected in parallel with the primary coil, refrigerating apparatus adapted to supply refrigerant to either the primary or the evaporator coil, and means for alternately supplying refrigerant to the primary and evaporator coils in response to conditions within the car.

3. In combination with a passenger car, means for forcing a current of air into the car, primary and secondary coils in the path of the air, a fluid circuit including the secondary coil, an evaporator coil in the fluid circuit connected in parallel with the primary coil, refrigerating apparatus adapted to supply refrigerant to either the primary or the evaporator coil, and means for supplying refrigerant to the primary coil as long as cooling of the air current is required and thereafter to supply refrigerant to the evaporator coil for reserve use.

4. In combination with a passenger car, means for forcing a current of air into the car, primary and secondary coils in the path of the air, a fluid circuit including the secondary coil, an evaporator coil in the fluid circuit connected in parallel with the primary coil, refrigerating apparatus adapted to supply refrigerant to either the primary or the evaporator coil, means for supplying refrigerant to the primary coil as long as cooling of the air current is required and thereafter to supply refrigerant to the evaporator coil for reserve use, and means for rendering the refrigerating apparatus inactive when the reserve refrigeration reaches a predetermined amount.

5. In combination with a passenger car, means for forcing a current of air into the car, primary and secondary coils in the path of the air, a fluid circuit including the secondary coil, an evaporator coil in the fluid circuit connected in parallel with the primary coil, refrigerating apparatus adapted to supply refrigerant to either the primary or the evaporator coil, an electrically operated drive for the refrigerating apparatus, and means for maintaining the drive in operation as long as either the primary coil or the evaporator coil require refrigeration according to predetermined conditions.

6. In combination with a passenger car, means for forcing a current of air into the car, primary and secondary coils in the path of the air, a fluid circuit including the secondary coil, an evaporator coil in the fluid circuit connected in parallel with the primary coil, apparatus for supplying refrigerant to either the primary or the evaporator coil according to predetermined conditions, and means for operating the apparatus at a higher suction pressure when the primary coil is being fed with refrigerant than when the evaporator coil is receiving refrigerant from the apparatus.

7. In combination with a passenger car, means for forcing a current of air into the car, primary and secondary coils in the path of the air, a fluid circuit including the secondary coil, an evaporator coil in the fluid circuit connected in parallel with the primary coil, apparatus for supplying refrigerant to either the primary or the evaporator coil according to predetermined conditions, and means for operating the apparatus at a higher suction pressure when the primary coil is being fed with refrigerant than when the evaporator coil is receiving refrigerant from the apparatus, and valve means for preventing refrigerant from condensing in the evaporator coil when the primary coil is in operation.

8. In combination with a passenger car, means for forcing a current of air into the car, primary and secondary coils in the path of the air including a fluid medium in the latter coil, a fluid circuit including the secondary coil, an evaporator coil in the fluid circuit connected in parallel with the primary coil, apparatus adapted to supply refrigerant to the primary coil under predetermined conditions, and to the evaporator coil under other conditions, and means for circulating the fluid in said circuit.

9. In combination with a passenger car, means for forcing a current of air into the car, primary and secondary coils in the path of the air including a fluid medium in the latter coil, a fluid circuit including the secondary coil, an evaporator coil in the fluid circuit connected in parallel with the primary coil, apparatus including a compressor normally supplying refrigerant to the primary coil at a relatively high suction pressure when cooling of the air is required, but being adapted to supply refrigerant to the direct expansion coil in the fluid circuit at a relatively low suction pressure when immediate cooling of the air is not required.

10. The method of conditioning air under forced draft which comprises circulating refrigerant between a liquefying zone and a first evaporating zone located in an air conditioning zone in the path of the circulating air, removing heat from air to be conditioned in said conditioning zone by direct evaporation of refrigerant in said evaporating zone, circulating refrigerant between said liquefying zone and a second evaporating zone when refrigerant liquefaction occurs in said liquefying zone faster than refrigerant evaporation in said first evaporating zone, cooling a holdover in a storage zone by evaporation of refrigerant in said second evaporating zone, circulating holdover from said storage zone to said air conditioning zone and there removing heat from air to be conditioned when refrigerant liquefaction is insufficient to cool the air.

11. An air conditioning system for a vehicle comprising a compressor, condenser and evaporator in refrigerant circulating relationhip and associated with said vehicle, said evaporator being located in the path of air to be conditioned for said vehicle, means for driving said compressor in functional relationship to the motion of the vehicle, a second evaporator, means for cooling a holdover with said second evaporator, means for circulating said holdover in thermal exchange relationship with air to be conditioned when said compressor, because of inadequate car speed, lacks sufficient capacity to condition the air.

12. An air conditioning system for a vehicle comprising a compressor, condenser and evaporator in refrigerant circulating relationship and associated with said vehicle, said evaporator being located in the path of air to be conditioned for said vehicle, means for driving said compressor from a rotating part on the vehicle and in functional relationship to the motion of the vehicle, a second evaporator connected to said condenser and compressor in thermal exchange relationship with a holdover, means causing said second evaporator to cool said holdover when said compressor because of sufficient car speed and/or relatively low heat load attains excess refrigerating capacity, and means for circulating the holdover in thermal exchange relationship with air to be conditioned when the power for operating the compressor from said rotating part falls below a predetermined minimum.

13. In combination with a passenger car, means for forcing a current of air into the car, primary and secondary coils in the path of the air, a fluid circuit including the secondary coil, an evaporator coil in the fluid circuit connected in parallel with the primary coil, refrigerating apparatus adapted to supply refrigerant to the primary and evaporator coils, means for circulating the fluid in said circuit, and means responsive to the temperature within the car for controlling the operation of the refrigerating apparatus.

14. In combination with a passenger car, means for forcing a current of air into the car, primary and secondary coils in the path of the air including a fluid medium in the latter coil, apparatus for supplying refrigerant to the primary coil and for abstracting heat from the fluid medium in the secondary coil, and means responsive at least in part to the speed of the car for selecting which coil, if either, is in operation.

15. In combination with a passenger car, means for forcing a current of air into the car, primary and secondary coils in the path of the air, a fluid circuit including the secondary coil, an evaporator coil in the fluid circuit, means for circulating the fluid in the circuit, and means including the same refrigerating apparatus for supplying refrigerant to the primary and the evaporator coils.

16. The method of conditioning air for a vehicle by power taken from one of the vehicle wheels which consists in utilizing the power whenever it exceeds a given minimum for operating refrigerating apparatus to cool air delivered by forced draft to the vehicle interior, utilizing the power thus characterized to provide cooling of a holdover when the air in the vehicle has been sufficiently cooled, and circulating the holdover in heat exchange relation to said draft in response to a drop in said power below the predetermined minimum.

17. In an air conditioning system having a varying heat load, a high temperature evaporator for cooling air by direct heat exchange, a low temperature evaporator for freezing water, means responsive to atmospheric conditions in an enclosure served by the system for selectively supplying refrigerant to said high temperature evaporator during high air conditioning load periods for cooling said air by direct expansion of the refrigerant and to said low temperature evaporator during low air conditioning load periods for freezing water, and means for utilizing the refrigerating effect of said frozen water to cool said air when the high temperature evaporator is inoperative.

MARTIN P. WINTHER.